United States Patent [19]

Knauss

[11] Patent Number: 5,344,802
[45] Date of Patent: Sep. 6, 1994

[54] MGO-SPINEL REFRACTORY MIX AND SHAPES MADE THEREFROM

[75] Inventor: Richard J. Knauss, Pittsburgh, Pa.

[73] Assignee: Indresco Inc., Dallas, Tex.

[21] Appl. No.: 152,900

[22] Filed: Nov. 15, 1993

[51] Int. Cl.$^5$ .................................. C04B 35/04
[52] U.S. Cl. ........................... 501/120; 501/121
[58] Field of Search ........................... 501/120, 121

[56] References Cited

U.S. PATENT DOCUMENTS

| | | | |
|---|---|---|---|
| 2,160,924 | 6/1939 | Sullivan | 501/121 |
| 2,775,527 | 12/1956 | Austin et al. | 501/120 |
| 3,184,531 | 5/1965 | McCreight et al. | 501/120 X |
| 3,607,325 | 9/1971 | Spangler | 501/124 |
| 3,901,721 | 8/1975 | Doman | 501/108 |
| 4,729,974 | 3/1988 | Nazirizadeh et al. | 501/120 |
| 4,780,434 | 10/1988 | Watanabe et al. | 501/120 |
| 4,833,109 | 5/1989 | Macey et al. | 501/120 |
| 4,954,463 | 9/1990 | Knauss | 501/120 |
| 4,971,934 | 11/1990 | Schiavi et al. | 501/120 |
| 5,021,374 | 6/1991 | Macey et al. | 501/120 |

FOREIGN PATENT DOCUMENTS

| | | | |
|---|---|---|---|
| 0099306 | 9/1974 | Japan | 501/120 |
| 0184693 | 7/1966 | U.S.S.R. | 501/120 |
| 0292926 | 1/1971 | U.S.S.R. | 501/120 |
| 0313817 | 9/1971 | U.S.S.R. | 501/120 |
| 0867905 | 9/1981 | U.S.S.R. | 501/120 |

*Primary Examiner*—Mark L. Bell
*Assistant Examiner*—David R. Sample
*Attorney, Agent, or Firm*—John L. Sigalos

[57] ABSTRACT

A refractory mix and resultant shapes formed by burning the mix, the mix comprising a magnesia-alumina spinel grain containing at least 27% MgO by weight, a fused magnesite grain, and up to 10% by weight alumina, it being possible to substitute a sintered magnesite grain for up to 50% by weight of the fused magnesite grain.

8 Claims, No Drawings

MGO-SPINEL REFRACTORY MIX AND SHAPES MADE THEREFROM

BACKGROUND OF THE INVENTION

The present invention relates to certain spinel-containing refractory mixes and resultant shapes, particularly brick suitable for use in rotary lime and cement kilns.

U.S. Pat. No. 5,021,364 describes the efforts to replace magnesite-chrome refractory shapes with other material including magnesite-spinel brick. This patent discloses that improved thermal spalling resistance can be obtained, particularly in kilns with lime-rich clinkers, when one utilizes a purified magnesia-alumina spinel grain and utilizes a dead-burned (sintered) magnesite therewith.

Such magnesite spinel brick, while having found general acceptance throughout the rotary cement kiln industry as a chrome-free alternative to magnesite-chrome brick, have relatively low strength at temperatures greater than 2500° F. which may impart a limitation on the service performance of these brick. Moreover, in some current cement kilns magnesite-spinel brick are finding difficulty because these kilns are fired with liquid, hazardous waste fuels. Such fuels are high in chloride and sulfur and the present magnesite-spinel brick do not have a sufficiently high corrosion resistance to such fuels and thus they lack the desired service performance.

SUMMARY OF THE INVENTION

The present invention provides magnesite-spinel refractory mixes and shapes, particularly brick with improved hot strength values and improved corrosion resistance.

Briefly stated, the present invention comprises a refractory mix for forming shaped refractories comprising a magnesia-alumina spinel grain containing at least 27% MgO by weight, a fused magnesite grain, and up to 8% by weight alumina, it being possible to substitute up to 50% by weight of the fused magnesite grain with a sintered magnesite grain.

The present invention also comprises a shaped refractory, preferably a brick, formed by burning a shaped mix comprising a magnesia-alumina spinel grain containing at least 27% MgO by weight, a fused magnesite grain, up to 50% substitution of the fused magnesite grain with a sintered magnesite, and up to 8% by weight alumina.

DETAILED DESCRIPTION

The instant invention is applicable to mixes and burning the same to form a variety of shaped refractories. It is particularly useful with respect to brick, especially brick for use in lime and cement kilns and will be discussed in connection therewith.

The mix of the present invention comprises two essential ingredients, namely a magnesia-alumina spinel grain containing at least 27% MgO by weight and a fused magnesite grain.

The magnesia-alumina spinel grain used must contain at least 27% MgO by weight. The spinel utilized need not be a high purity fused spinel such as in U.S. Pat. No. 5,021,734 although it is preferred to use a low silica spinel. The spinel itself can be either sintered or fused.

With respect to the magnesite, it must be a fused magnesite grain containing at least 85% MgO, preferably fused magnesite containing at least 95% MgO, most preferably 98% MgO. While it is preferred to utilize only fused magnesite, up to 50% of the fused magnesite may be substituted by sintered magnesite.

In addition to the two essential components, in some instances it is possible to add minor amounts of fine alumina to the mix composition, namely up to about 10% by weight, but preferably, no more than about 5% by weight. The alumina should be sized $-150$ mesh, preferably $-325$ mesh. Its purity level should be at least 95%, preferably 99% $Al_2O_3$. This alumina will react with the magnesite fines during burning to form additional spinel in situ. The use of such alumina addition is preferred in instances where one would want additional spinel in the matrix of the brick.

With respect to proportions, it is preferred to utilize from 60% to 90% by weight of fused magnesite grain or a combination of fused and sintered magnesite grain and correspondingly 10% to 40% of the magnesia-alumina spinel. As noted above, in those instances where alumina is to be added to the mix it is added in an amount up to 10% by weight and the amount of preformed spinel is correspondingly decreased.

Shaped refractory products, particularly brick of the present invention, can be manufactured in the conventional manner by forming the brick in a conventional press and firing the same at temperatures and under conditions conventionally used, namely a pressing pressure of about 12,000 psi and a burn of about 2800° F. to 3150° F. using, for example, a 10 hour hold.

Moreover, as is conventional in forming brick conventional binders and lubricants are utilized in the mix in their usual amounts and for their usual effects; ordinarily about 1 to 5% by weight of binder and $\leq 0.5$ of the lubricant for each 100% by weight of the mix. Thus, for example, conventional lignosulfonates are utilized as binders and oils as lubricants. SILICANIT is a trademark for a conventional lignin containing binder and STAYSOL is a conventionally used lubricant.

The invention will be further described in connection with the following examples which are set forth for purposes of illustration only.

EXAMPLES 1 to 4

A series of four different brick mixes were formulated and their formulations in % by weight are set forth in Table I below.

TABLE I

| | Example No. | | | |
|---|---|---|---|---|
| | 1 | 2 | 3 | 4 |
| Mix: | | | | |
| Sintered Magnesite | | | | |
| $-4 + 10$ mesh | 18% | — | — | — |
| $-10 + 28$ mesh | 19 | — | — | — |
| $-28$ mesh | 8 | — | — | — |
| Fines (70% $-325$ mesh) | 30 | 33 | — | 33 |
| Fused Magnesite | | | | |
| $-4 + 10$ mesh | — | 19.1 | 21 | 21 |
| $-10 + 28$ mesh | — | 21.3 | 17 | 17 |
| $-28$ mesh | — | — | 4 | 4 |
| Fines (70% $-325$ mesh) | — | — | 33 | — |
| Fused Magnesia-Alumina Spinel ($-6$ Mesh) and (containing 28% by wt. MgO) | 25 | 26.6 | 25 | 25 |
| Plus Additions: | | | | |

TABLE I-continued

|  | Example No. | | | |
| --- | --- | --- | --- | --- |
|  | 1 | 2 | 3 | 4 |
| Lignin Liquor (SILICANIT) | 3.7 | 3.1 | 3.1 | 3.1 |
| Oil (STAYSOL) | 0.5 | 0.5 | 0.5 | 0.5 |

Each of the mixes were formed into brick by mixing the components using a Lancaster mixer and pressing at 12,000 psi on a Lassman hydraulic press. The brick were burned at 2800° F. using a 10 hour hold and then tested. The test results are set forth in Table II.

TABLE II

|  | 1 | 2 | 3 | 4 |
| --- | --- | --- | --- | --- |
| Density at the Press, pcf: | 188 | 192 | 190 | 190 |
| Linear Change During Burning, %: | 0.0 | +0.2 | +0.3 | +0.3 |
| Bulk Density, pcf: | 181 | 182 | 181 | 182 |
| Apparent Porosity, %: | 17.3 | 17.7 | 18.8 | 18.2 |
| Apparent Specific Gravity: | 3.51 | 3.54 | 3.57 | 3.56 |
| Modulus of Rupture | | | | |
| At Room Temperature, psi: | 600 | 720 | 730 | 620 |
| At 2300° F., psi: | 1000 | 1320 | 1200 | 1050 |
| At 2500° F., psi: | 140 | 310 | 300 | 300 |
| Modulus of Elasticity (psi × $10^6$): | 1.7 | 2.0 | 1.9 | 1.8 |

The chemical analysis of the mixes was as follows:

|  | Example No. | | | |
| --- | --- | --- | --- | --- |
|  | 1 | 2 | 3 | 4 |
| Chemical Analysis* (Calcined Basis) | | | | |
| Silica ($SiO_2$) | 0.67% | 0.67% | 0.58% | 0.53% |
| Alumina ($Al_2O_3$) | 16.57 | 18.52 | 16.06 | 16.17 |
| Titania ($TiO_2$) | 0.65 | 0.68 | 0.65 | 0.69 |
| Iron Oxide ($Fe_2O_3$) | 0.78 | 0.89 | 1.13 | 0.94 |
| Chromic Oxide ($Cr_2O_3$) | 0.13 | 0.16 | 0.13 | 0.15 |
| Lime (CaO) | 1.20 | 1.24 | 1.47 | 1.34 |
| Zirconia ($ZrO_2$) | — | — | 0.04 | 0.04 |
| Total Analyzed | 20.00% | 21.28% | 20.10% | 19.90% |
| By Difference | 80.00 | 78.72 | 79.90 | 80.10 |
| Magnesia (MgO) | | | | |
| Total | 100.00% | 100.00% | 100.00% | 100.00% |
| Lime to Silica Ratio | 1.8 | 1.9 | 2.5 | 2.5 |

*By x-ray spectrograph

The mix of Example 1 utilized a sintered magnesite grain as called for in U.S. Pat. No. 5,021,374 and it will be noted that they had significantly lower hot strengths than brick made in accord with the present invention.

Brick made according to the present invention were made commercially and placed in a cement rotary kiln which utilized liquid waste fuels. To-date these brick have outperformed brick of the prior art and the user is projecting a doubling of service life.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A refractory mix for forming shaped refractories consisting essentially of 10 to 40% by weight of a magnesia-alumina spinel grain containing at least 28% MgO by weight, 60 to 90% by weight of a fused magnesite grain and up to 10% by weight alumina.

2. The mix of claim 1 including a binder and in which a sintered magnesite grain is substituted for up to about 50% by weight of the fused magnesite grain.

3. The mix of claim 1, wherein the mix consists essentially of 10 to 40% by weight of magnesia-alumina spinel grain containing at least 28% MgO by weight, 0% by weight alumina and, correspondingly, 60% to 90% by weight of a fused magnesite grain.

4. The mix of claim 3, including a binder and in which a sintered magnesite grain is substituted for up to about 50% by weight of the fused magnesite grain.

5. A refractory shape formed by burning a mix consisting essentially of 10 to 40% by weight of a magnesia-alumina spinel grain containing at least 28% MgO by weight, 60 to 90% by weight of a fused magnesite grain and up to 10% by weight alumina.

6. The shape of claim 5 in the form of a brick and wherein a binder is included in the mix.

7. The brick of claim 6 wherein the mix consists essentially of 10 to 40% by weight of a magnesia-alumina spinel grain containing at least 28% MgO by weight, 0% by weight alumina and, correspondingly, 60 to 90% by weight of a fused magnesite grain.

8. The brick of claim 7 including a binder and in which a sintered magnesite grain is substituted for up to about 50% by weight of the fused magnesite grain.

* * * * *